United States Patent
Popovski et al.

(10) Patent No.: US 11,251,486 B2
(45) Date of Patent: Feb. 15, 2022

(54) BATTERY ARRAY ATTACHMENT ASSEMBLY AND METHOD

(71) Applicant: Ford Global Technologies, LLC, Dearborn, MI (US)

(72) Inventors: Mike Popovski, Warren, MI (US); Ihab Grace, Grosse Pointe Woods, MI (US); Abigail Evelyn Christensen, Canton, MI (US); John Jardine, Harrison Township, MI (US); Anil Reddy Pullalarevu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 16/416,415

(22) Filed: May 20, 2019

(65) Prior Publication Data

US 2020/0373529 A1 Nov. 26, 2020

(51) Int. Cl.
*H01M 50/20* (2021.01)
*F16B 19/05* (2006.01)

(52) U.S. Cl.
CPC ........... *H01M 50/20* (2021.01); *F16B 19/05* (2013.01); *H01M 2220/20* (2013.01)

(58) Field of Classification Search
CPC ... H01M 2/1077; H01M 2/1083; H01M 50/20
See application file for complete search history.

(56) References Cited

U.S. PATENT DOCUMENTS

| | | | |
|---|---|---|---|
| 3,322,177 A | | 5/1967 | Phelan |
| 4,699,855 A | * | 10/1987 | Abraham ............ H01M 50/147 429/175 |
| 5,040,627 A | * | 8/1991 | Swayze .................. B60R 16/04 180/68.5 |
| 5,052,198 A | * | 10/1991 | Watts ...................... B60R 16/04 70/58 |
| 5,501,289 A | * | 3/1996 | Nishikawa ............ H01M 50/20 180/68.5 |
| 9,517,686 B1 | * | 12/2016 | Paramasivam ..... H01M 2/1083 |
| 9,853,262 B2 | | 12/2017 | Subramanian et al. |
| 2013/0164592 A1 | | 6/2013 | Maguire et al. |
| 2017/0214012 A1 | | 7/2017 | Benedict et al. |

FOREIGN PATENT DOCUMENTS

JP 4965012 7/2012

\* cited by examiner

*Primary Examiner* — Olatunji A Godo
(74) *Attorney, Agent, or Firm* — David Kelley, Esq.; Carlson, Gaskey & Olds, P.C.

(57) ABSTRACT

A battery pack assembly includes, among other things, an enclosure providing an interior area that houses one or more battery arrays, a bracket secured relative to the enclosure, and a bracket fastener having a stem extending longitudinally from a head along a longitudinal axis of the bracket fastener. The head is enlarged radially relative to the stem. The head is captured between the bracket and a surface of the enclosure. A battery pack securing method includes, among other things, securing a bracket relative to an enclosure of a battery pack to capture a head of a bracket fastener between the bracket and a surface of an enclosure. The bracket fastener has a stem that extends longitudinally from the head of the bracket fastener.

17 Claims, 5 Drawing Sheets

BATTERY ARRAY ATTACHMENT ASSEMBLY AND METHOD

TECHNICAL FIELD

This disclosure relates generally to securing battery arrays within an enclosure of a battery pack.

BACKGROUND

An electrified vehicle can differ from a conventional motor vehicle because the electrified vehicle can be selectively driven using one or more electric machines. The electric machines can drive the electrified vehicle instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Battery arrays can power the one or more electric machines of an electrified vehicle. The battery arrays can, in some examples, power other electrical loads of the electrified vehicle. The battery arrays can be relatively high-voltage battery arrays.

The battery arrays can each include a plurality of interconnected battery cells that store energy. A battery pack can house the battery arrays within an enclosure.

SUMMARY

A battery pack attachment assembly according to an exemplary aspect of the present disclosure includes, among other things, an enclosure providing an interior area that houses one or more battery arrays, a bracket secured relative to the enclosure, and a bracket fastener having a stem extending longitudinally from a head along a longitudinal axis of the bracket fastener. The head is enlarged radially relative to the stem. The head is captured between the bracket and a surface of the enclosure.

In a further non-limiting embodiment of the foregoing assembly, the stem extends from the head through an aperture in the bracket.

A further non-limiting embodiment of any of the foregoing assemblies includes a mechanical fastener that engages the bracket fastener to secure at least one of the battery arrays within the interior area of the enclosure.

In a further non-limiting embodiment of any of the foregoing assemblies, the mechanical fastener threadably engages the bracket fastener.

In a further non-limiting embodiment of any of the foregoing assemblies, the bracket fastener is a swage nut.

In a further non-limiting embodiment of any of the foregoing assemblies, the bracket fastener is a first bracket fastener. The assembly further includes a second bracket fastener having a head captured between the bracket and the surface of the enclosure.

A further non-limiting embodiment of any of the foregoing assemblies includes a first mechanical fastener that engages the first bracket fastener to secure a first one of the battery arrays, and a second mechanical fastener that engages the second bracket fastener to secure a different, second one of the battery arrays.

In a further non-limiting embodiment of any of the foregoing assemblies, the bracket is riveted to the enclosure to secure the bracket relative to the enclosure.

In a further non-limiting embodiment of any of the foregoing assemblies, a bracket pocket of the bracket is displaced along the longitudinal axis in a first direction relative to a primary bracket portion of the bracket. The head is disposed within an open area between the bracket pocket and the surface of the enclosure. The primary bracket portion is secured directly to the enclosure.

In a further non-limiting embodiment of any of the foregoing assemblies, an enclosure pocket of the enclosure is displaced along the longitudinal axis in an opposite, second direction relative to a primary enclosure portion. The enclosure pocket provides some of the open area.

In a further non-limiting embodiment of any of the foregoing assemblies, the surface of the enclosure is a surface of an enclosure tray.

A battery pack securing method according to an exemplary aspect of the present disclosure includes, among other things, securing a bracket relative to an enclosure of a battery pack to capture a head of a bracket fastener between the bracket and a surface of an enclosure. The bracket fastener has a stem that extends longitudinally from the head of the bracket fastener.

A further non-limiting embodiment of the foregoing method includes engaging the stem of the bracket fastener with a mechanical fastener to secure a battery array within an open area of the enclosure.

In a further non-limiting embodiment of the foregoing method, the mechanical fastener extends through a bore within an endplate of the battery array. The method further includes clamping the endplate between a head of the mechanical fastener and the bracket during the engaging of the mechanical fastener with the bracket fastener.

In a further non-limiting embodiment of the foregoing method, the mechanical fastener threadably engages the bracket fastener during the clamping.

A further non-limiting embodiment of the foregoing method includes riveting the bracket to the enclosure during the securing.

In a further non-limiting embodiment of the foregoing method, the bracket fastener is a swage nut.

In a further non-limiting embodiment of the foregoing method, the head of the bracket fastener is a first head of a first bracket fastener. The method further includes securing the bracket relative to the enclosure to hold a second head of a second bracket fastener between the bracket and the surface of the enclosure.

A further non-limiting embodiment of the foregoing method includes engaging the stem of the first bracket fastener with a first mechanical fastener to secure a first battery array to the enclosure, and engaging a stem of the second bracket fastener with a second mechanical fastener to secure a different, second battery array to the enclosure.

A further non-limiting embodiment of the foregoing method includes using the first and second battery arrays to power a powertrain of an electrified vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to securing battery arrays within an enclosure of a battery pack. In particular, the disclosure describes securing battery arrays using a bracket and at least one bracket fastener. The approach to securing can facilitate reducing localized stress concentrations when, for example, a side impact load is applied to the battery pack.

Figure 1:
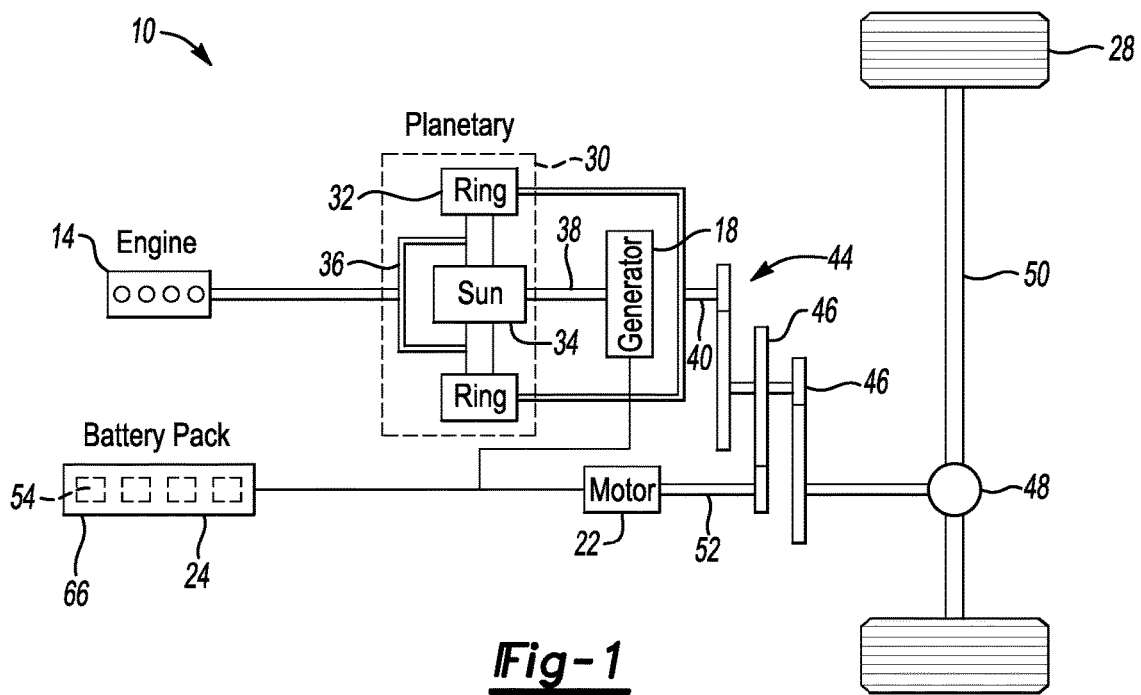
FIG. 1 illustrates a highly schematic view of a powertrain for an electrified vehicle.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In an embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In the exemplary embodiment, the second drive system can be considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle battery assembly. The battery pack 24 may have the form of a high-voltage battery that is capable of outputting electrical power to operate the motor 22 and the generator 18. The battery pack 24 is a traction battery pack as the battery pack 24 can provides power to propel the vehicle drive wheels 28. The battery pack 24 includes a plurality of battery arrays 54. Each of the battery arrays 54 can include a plurality of individual battery cells.

Figure 2:
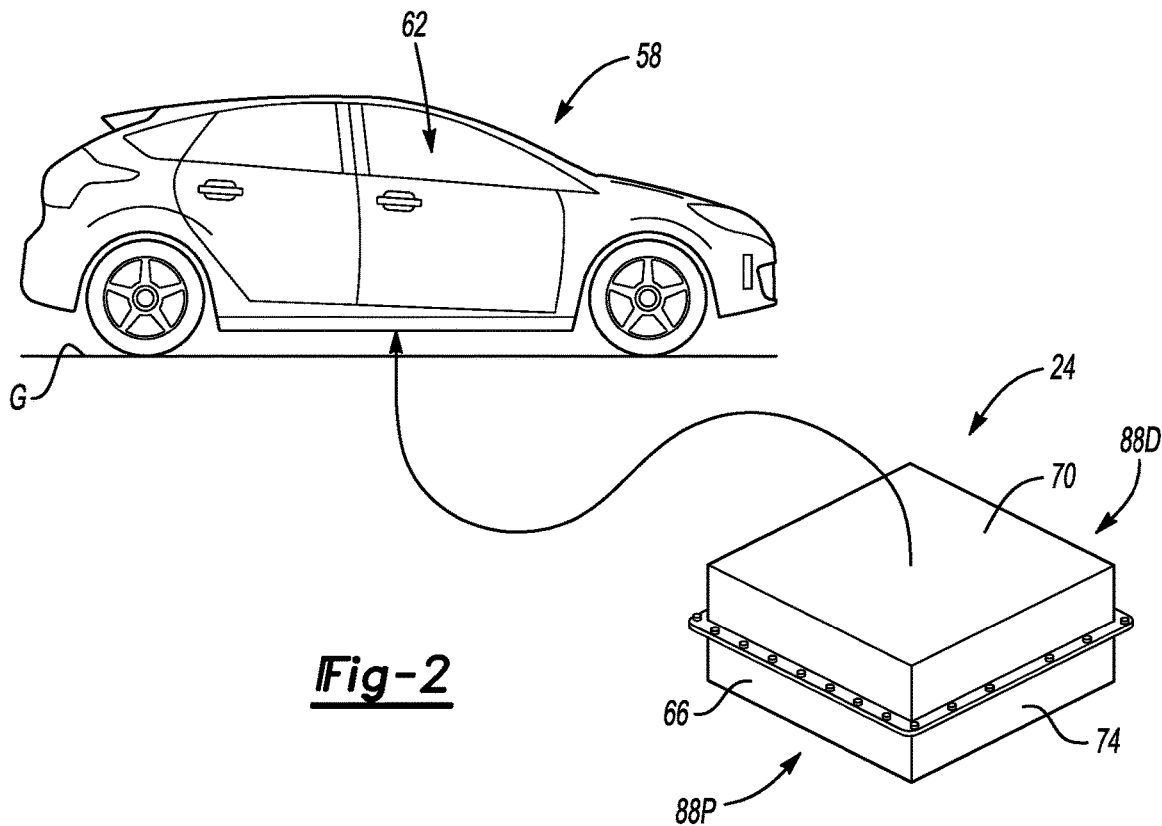
FIG. 2 illustrates how a battery pack of the powertrain of FIG. 1 can be positioned within the electrified vehicle according to an exemplary aspect of the present disclosure.

With reference to FIG. 2, an electrified vehicle 58 can include the powertrain 10 of FIG. 1. The battery pack 24 of the powertrain 10 can be secured to adjacent an underside of the electrified vehicle 58 such that the battery pack 24 is vertically beneath a passenger compartment 62 of the electrified vehicle 58. Vertical, for purposes of this disclosure is with reference to ground G and the general orientation of the electrified vehicle 58 during ordinary operation.

The battery pack 24 includes an enclosure 66 having a lid 70 and a tray 74. The lid 70 can be secured to the tray 74. The battery arrays 54, among other things, are housed within the enclosure 66.

Figure 3:
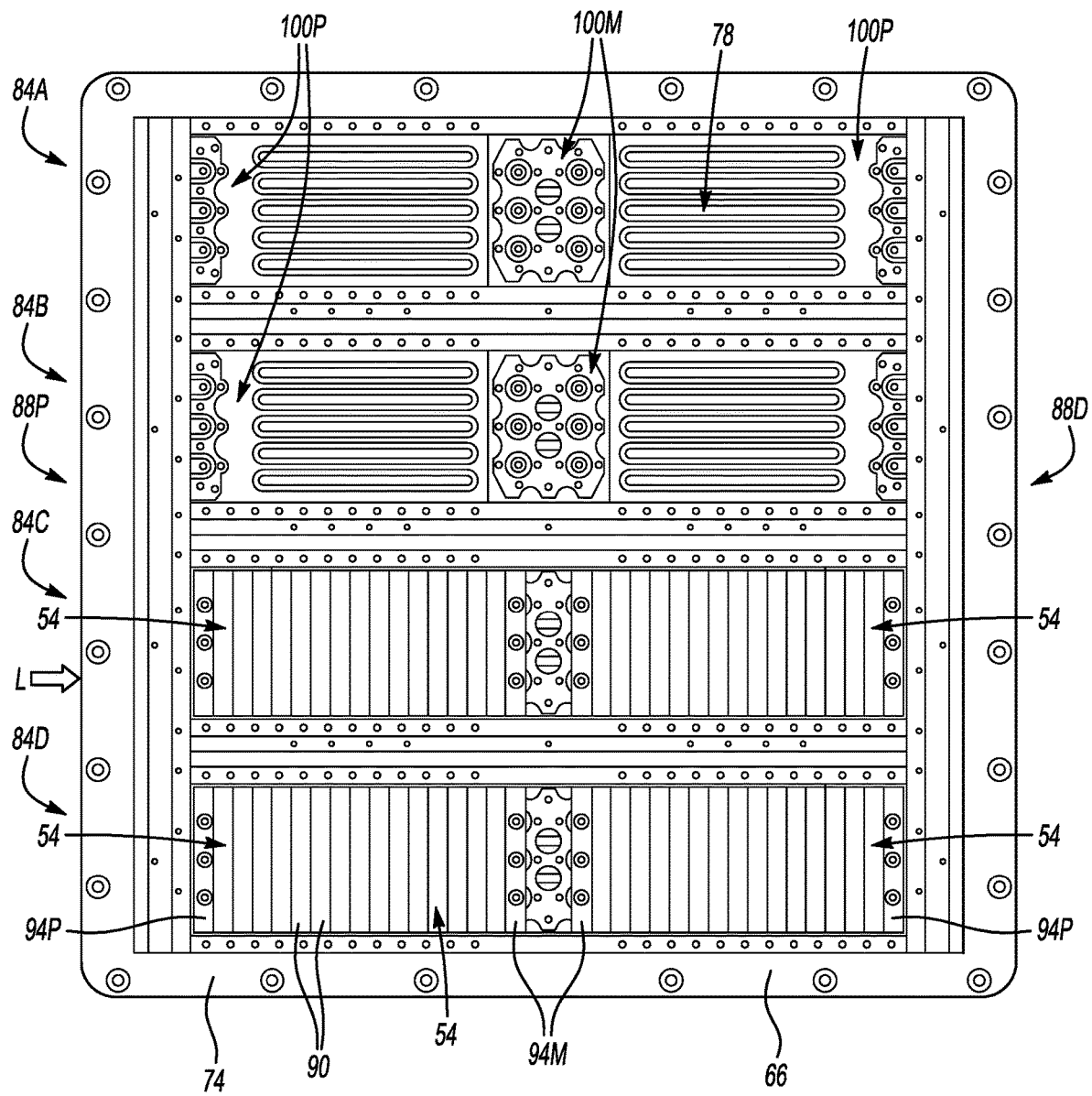
FIG. 3 illustrates a top view of the battery pack of FIG. 2 with a cover of an enclosure removed and with selected battery arrays removed.

FIG. 3 shows a top view of the battery pack 24 with the lid 70 removed to reveal an interior area 78 of the enclosure 66. The battery arrays 54 are housed within the interior area 78. The battery arrays 54 extend longitudinally in a cross-vehicle direction.

The battery arrays 54, in the exemplary embodiment, are accommodated within respective rows 84A, 84B, 84C, 84D of the enclosure 66. Each of the rows 84A-84D includes two battery arrays 54. Within each of the rows 84A-84D, one of the battery arrays 54 is closer to a passenger side 88P of the enclosure 66, and the other closer to a driver side 88D of the enclosure 66.

The battery arrays 54 each include a plurality of battery cells 90 disposed between a medial endplate 94M and a peripheral endplate 94P. Medial and peripheral are with reference to a longitudinal axis of the electrified vehicle 58. Since, in the exemplary embodiment, each of the rows 84A-84D accommodates two battery arrays 54, each of the rows 84A-84D accommodates two medial endplates 94M and two peripheral endplates 94P.

Peripheral attachment assemblies 100P and medial attachment assemblies 100M are used to secure battery arrays 54 relative to the enclosure 66. Within each of the rows 84A-84D, peripheral attachment assemblies 100P each interface with a respective one of the peripheral endplates 94P to secure the battery arrays 54 of that row relative to the enclosure 66. Within each of the rows 84A-84D, one medial attachment assembly 100M interfaces with the medial endplates 94M of both battery arrays 54 of that row to further secure the battery arrays 54 of that row relative to the enclosure 66.

The exemplary battery pack 24 thus includes eight peripheral attachment assemblies 100P each used to secure one of the peripheral endplates 94P relative to the enclosure 66. The exemplary battery pack 24 thus includes four medial attachment assemblies 100M each used to secure two of the medial endplates 94M relative to the enclosure 66.

In FIG. 3, the battery arrays 54 of rows 84A and 84B have been removed to reveal portions of the peripheral attachment assemblies 100P and medial attachment assemblies 100M associated with the rows 84A and 84B.

Figure 4:
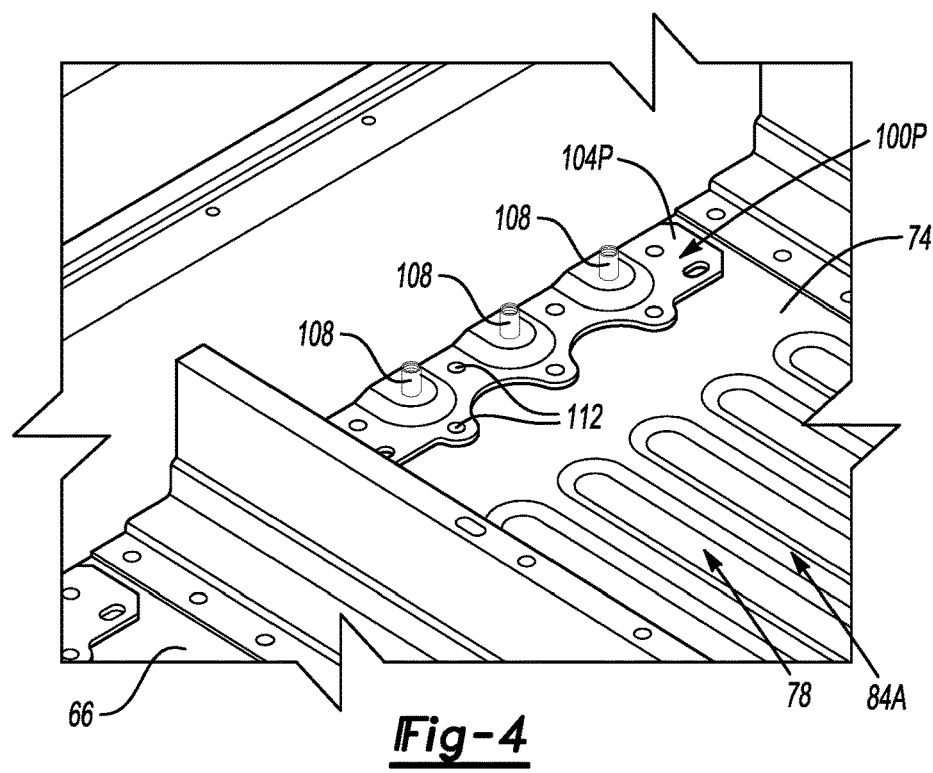
FIG. 4 illustrates a close-up perspective view of a first exemplary type of bracket secured relative to a tray of the enclosure such that portions of bracket fasteners are captured between the bracket and a surface of the tray.
Figure 5:
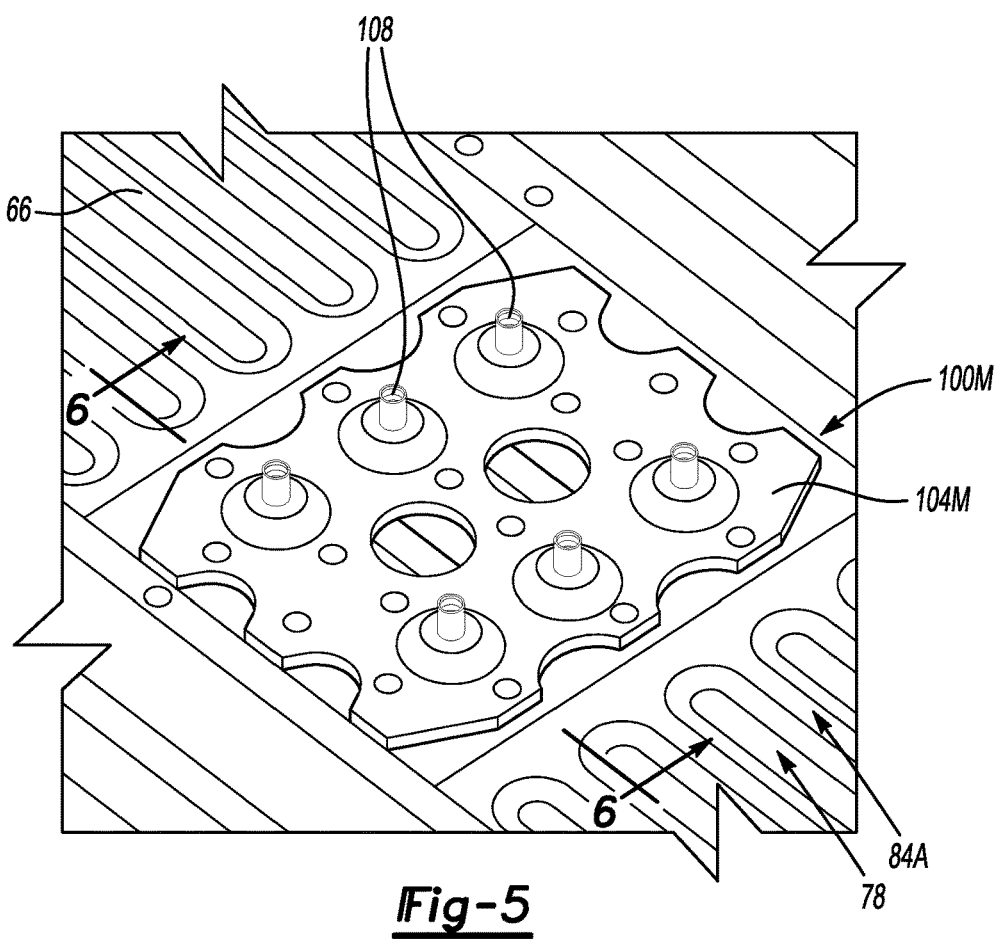
FIG. 5 illustrates a close-up perspective view of a second exemplary type of bracket secured relative to the tray of the enclosure such that portions of bracket fasteners are captured between the bracket and a surface of the tray.

With reference now to FIGS. 4 and 5, the peripheral attachment assembly 100P on the passenger side of row 84A includes a bracket 104P and a plurality of bracket fasteners 108. For purposes of this disclosure, the bracket fasteners 108 can be any type of fastener having a flanged head and a stem or boss protruding from the flanged head. The stem or boss can be internally threaded.

In this exemplary embodiment, the bracket fasteners 108 are swage nuts. In other examples, other types of bracket fasteners 108 could be used including, but no limited to, barrel nuts, barrel bolts, Chicago screws, and sex bolts.

The remaining peripheral attachment assemblies 100P are similarly configured with bracket fasteners 108.

The medial attachment assembly 100M of row 84A includes a bracket 104M and a plurality of bracket fasteners 108—here again swage nuts. The remaining medial attachment assemblies 100M are similarly configured.

The brackets 104P and 104M are secured relative to the tray 74 with self-piercing rivets 112 in this example. In other examples, the 104P and 104M could be secured to the tray 74 utilizing another attachment strategy, such as welding.

Figure 6:
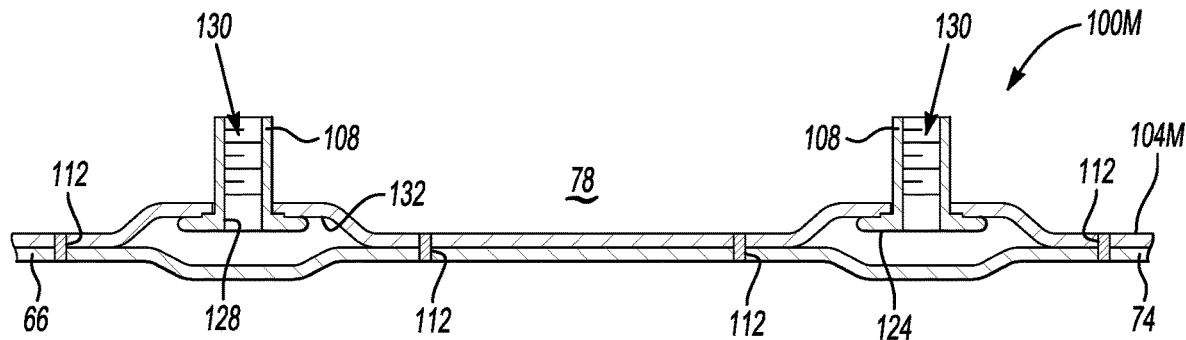
FIG. 6 illustrates a section view taken at line 6-6 in FIG. 5.
Figure 7:
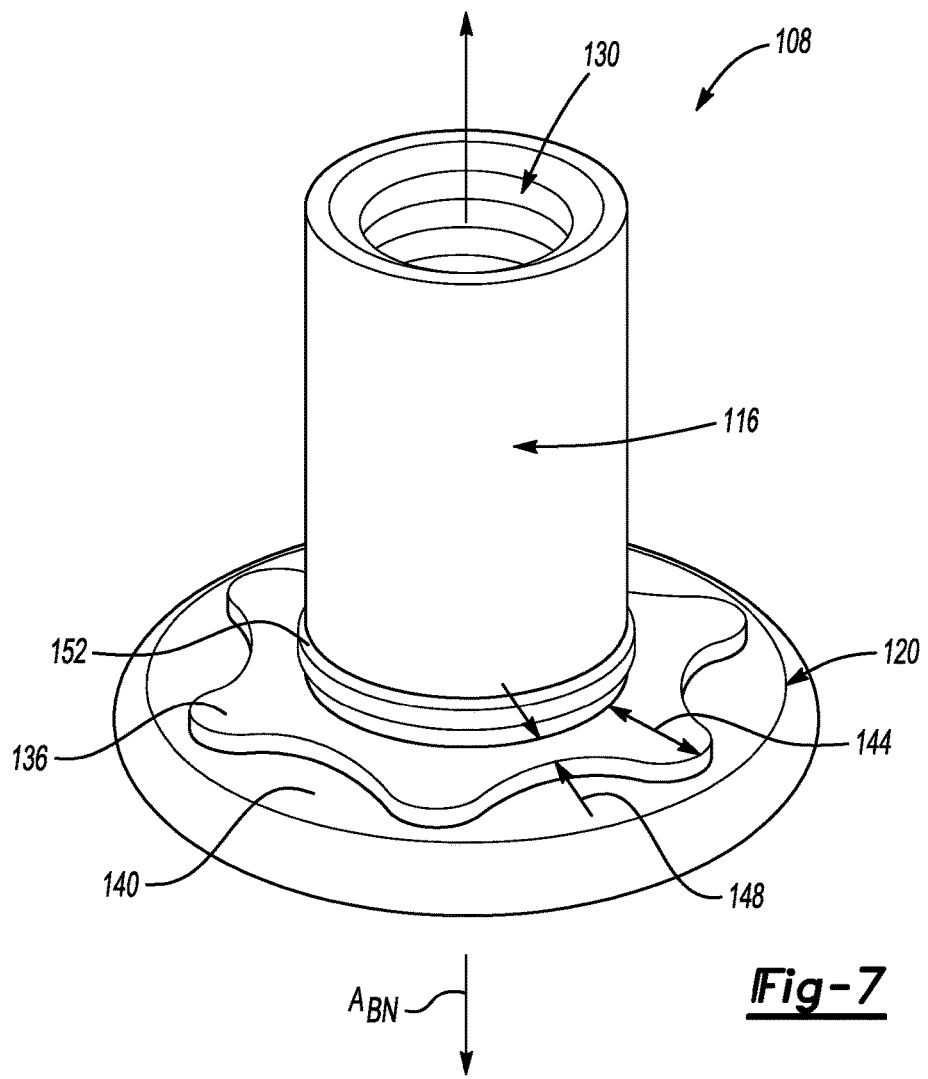
FIG. 7 illustrates a perspective view of a bracket fastener from the section view of FIG. 6 according to an exemplary embodiment.
Figure 8:
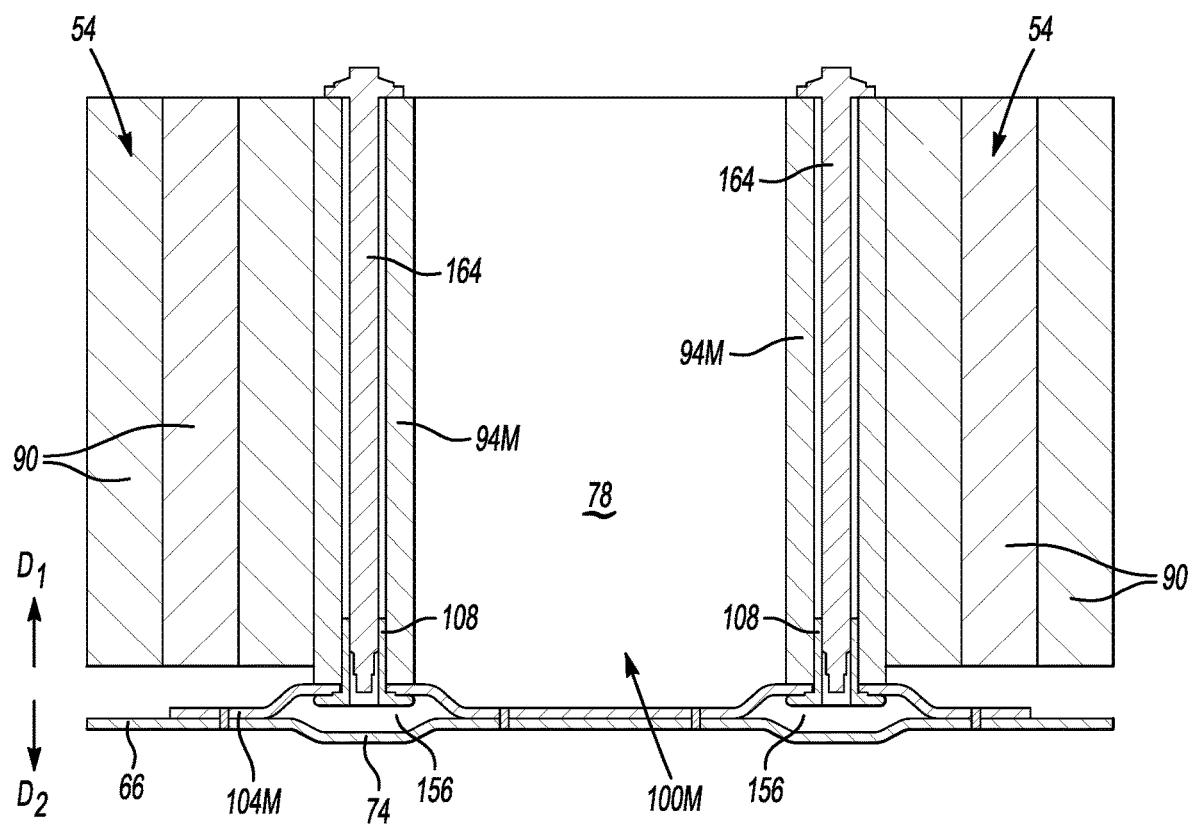
FIG. 8 illustrates the section view taken at line 6-6 when mechanical fasteners are engaging the bracket fasteners to secure battery arrays.

Referring now to FIGS. 6 and 7, the bracket fasteners 108 each have a stem 116 extending longitudinally from a head 120 along a longitudinal axis $A_{BN}$ of the bracket fastener 108. The head 120 is enlarged radially relative to the stem 116. When the bracket fastener 108 is in an installed position within the medial attachment assembly 100M, the head 120 is captured between the bracket 104M and a surface 124 of the tray 74. The stem 116 extends through an aperture 128 in the bracket 104M. The stem 116 includes a threaded bore 130 in the exemplary embodiment.

Prior to securing the bracket 104M to the tray 74, the bracket fasteners 108 are secured to the bracket 104M in an installed position. To secure one of the bracket fasteners 108 to the bracket 104M, the stem 116 is inserted into the respective aperture 128. The bracket fastener 108 is then moved along the axis $A_{BN}$ relatively toward a surface 132 of the bracket 104M until the head 120 contacts the surface 132.

The bracket fastener 108, in the exemplary embodiment, includes one or more features that block the bracket fastener 108 in the installed position from rotating relative to the bracket 104M. The bracket fastener 108, in the exemplary embodiment, further includes one or more features that block the bracket fastener 108 in the installed position from moving axially relative to the bracket 104M.

To block rotation of the bracket fastener 108 relative to the bracket 104M, the head 120 of the bracket fastener 108 includes a raised area 136. The raised area 136 protrudes along the axis $A_{BN}$ from a primary surface 140 of the head 120. The raised area 136 is the first area of the head 120 that contacts the surface 132 when the bracket fastener 108 is moved along the axis $A_{BN}$ toward the surface 132. Continued movement of the flange 120 against the surface 132 of the bracket 104M causes the raised area 136 to press into and deform areas of the bracket 104M.

The raised area 136 includes first areas 144 that project radially from the axis $A_{BN}$ a first distance and second areas 148 that project radially from the axis $A_{BN}$ a second distance. The first distance is less than the second distance. The first areas 144 and second areas 148 are circumferentially distributed about the axis $A_{BN}$ in an alternating fashion. When the raised area 136 is pressed into the surface 132 of the bracket 104M such that the bracket 104M is materially deformed, the raised area 136 blocks rotation of the bracket fastener 108 relative to the bracket 104M about the axis $A_{BN}$.

To block axial movement of the bracket fastener 108 from the installed position, the stem 116 of the bracket fastener 108 includes a radial flange 152 that is enlarged radially relative to the remaining portions of the stem 116. The radial flange 152 is positioned on the stem 116 such that, when the bracket fastener 108 is in an installed position within the aperture 128, the radial flange 152 is disposed within the aperture 128. As the bracket fastener 108 is moved along the axis $A_{BN}$ to the installed position, the radial flange 152 presses into, and materially deforms, the sides of the bracket 104M providing the aperture 128. This blocks axial movement of the bracket fastener 108 relative to the bracket 104M.

The pressing of the radial flange 152 into the bracket 104M can also help to limit rotation of the bracket fastener 108 relative to the bracket 104M. The pressing of the raised area 136 into the bracket 104M can also help to limit axial movement of the bracket fastener 108 relative to the bracket 104M. Clamping fixtures can be used to move the bracket fastener 108 into the installed position while deforming areas of the bracket 104M with the bracket fastener 108.

To facilitate the radial flange 152 and the raised area 136 of the bracket fastener 108 materially deforming the bracket 104M, the bracket 104M can be made of a first material, and the bracket fastener 108 can be made of a second material that harder than the first material. In an exemplary embodiment, the bracket 104M is aluminum and the bracket fastener 108 is steel.

Although the bracket fastener 108 incorporates the radial flange 152 and the raised area 136 in this example, another example could incorporate these features within the bracket 104M.

The above explanation in connection with FIGS. 6 and 7 describes how the bracket fasteners 108 are secured to the bracket 104M in an installed position. The bracket fasteners 108 of the peripheral attachment assemblies 100P are secured to the brackets 104P in a similar manner. That is, the bracket fasteners 108 of the peripheral attachment assemblies 100P are similar to the bracket fasteners 108 of the medial attachment assemblies 100M.

With reference now to FIGS. 3, and 6-8, after the bracket fasteners 108 are secured to the brackets 104M of the medial attachment assembly 100M, and the brackets 104M riveted to the tray 74, the battery arrays 54 can be positioned within the tray 74. The battery arrays 54 are positioned such that the medial endplates 94M are atop the brackets 104M.

The endplates 94M each include a plurality of bores 160. When the endplates 94M are positioned atop the bracket 104M, the stems 116 of the bracket fasteners 108 within the medial attachment assembly 100M each extend into a respective end portion of one of the bores 160.

Mechanical fasteners 164 are then inserted into an opposite end of the bores 160. The mechanical fasteners 164 are bolts, in this example, that are torqued to threadably engage the bracket fasteners 108. As previously described, the raised areas 136 and radial flange 152 can prevent the bracket fasteners 108 from dislodging from the bracket 104M as the mechanical fasteners 164 are torqued. When the mechanical fasteners 164 are torqued to the bracket fasteners 108, the endplates 94M are clamped between the bracket 104M and the heads of the mechanical fasteners 164 thereby securing the battery arrays 54 relative to the medial attachment assembly 100M.

The bracket fasteners 108, with their threaded bores 130, can facilitate locating the mechanical fasteners 164 relative to the bracket fasteners 108 when being inserted through the bores 160 to engage the bracket fasteners 108. Locating the mechanical fasteners 164 relative to the bracket fasteners 108 can be more efficient and repeatable than locating mechanical fasteners to a structure with a threaded exterior, for example.

Mechanical fasteners can be similarly received within bores of the endplates 94P to secure the battery arrays 54 relative to a respective one of the peripheral attachment assemblies thereby securing the battery arrays 54 within the interior area 78.

The areas of the bracket 104M providing the apertures 128 comprise bracket pockets. The bracket pockets are displaced in a direction $D_1$ relative to primary bracket portions, which are the portion of the bracket 104M secured directly to the tray 74 with the rivets 112 in the exemplary embodiment.

The areas of the tray 74 near the bracket fasteners 108 comprise enclosure pockets. The enclosure pockets are displaced in a direction $D_2$ relative to the primary enclosure portions, which are the portions of the tray 74 secured directly to the primary bracket portions with the rivets 112 in the exemplary embodiment.

The displacement of the bracket pockets and enclosure pockets establishes respective open area 156 between the head 120 of the bracket fasteners 108 and the tray 74. The heads 120 of the bracket fasteners 108 are captured within respective open areas 156. The bracket pockets and enclosure pockets can strengthen the bracket 104M and the tray 74 respectively.

Further, the open areas 156 can provide a space for debris to drain and collect without interfering with the interfaces between the bracket fasteners 108 and the mechanical fasteners 164. Debris can be, for example, an electrocoating that flakes off of the bracket fasteners 108, the mechanical fasteners 164, or both, when the mechanical fasteners 164 are torqued.

In this exemplary embodiment, the peripheral attachment assemblies 100P have similar open areas between areas of the brackets 104P and the tray 74.

Although the peripheral attachment assemblies 100P and medial attachment assemblies 100M are associated with the tray 74, and more specifically a floor of the tray, other examples could associate the peripheral attachment assemblies 100P and medial attachment assemblies 100M with another area of the enclosure 60, such as the lid 70 (see FIG. 2) or a side wall.

With reference to FIG. 3, securing the battery arrays 54 of a given row 84A-84D to the peripheral attachment assemblies 100P and medial attachment assemblies 100M can facilitate transferring a load through the battery pack 24. For example, if an impact load L is applied to the passenger side 88P of the battery pack 24, the load is transferred through the peripheral attachment assemblies 100P and medial attachment assemblies 100M across the battery pack 24.

In particular, for each of the rows 84A-84D, the medial attachment assemblies 100M are directly secured to both the battery array 54 on the passenger side and the battery array 54 on the driver side. Within each row 84A-84D, a portion of the load L can move through the respective bracket 104M from the battery array 54 on the passenger side to the battery array 54 on the driver side. This can help lengthen the time that the battery arrays 54 are under the load L and can reduce a peak load on the battery arrays 54. If the battery arrays 54 on the passenger side and driver side were not directly connected to a common bracket, the peak load on the battery arrays 54 on the passenger side could be higher.

A feature of the exemplary embodiment can thus include reducing a peak load on battery arrays in response to a side impact. Reducing the peak loads can help to avoid localized stress concentrations, which may lead to battery arrays detaching from surrounding structures.

The exemplary embodiment distributes the load using, among other things, the brackets, to reduce the peak load. The exemplary embodiment distributes the load further by positioning the attachments between the mechanical fasteners and the bracket fasteners about a perimeter of the brackets.

The mechanical fasteners and bracket fasteners can provide a clinch-style securing of the battery arrays within the enclosure. The clinch-style securing can secure various types of material. Fusion-style securing (i.e., welding) would be able to secure more limited types of materials.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery pack attachment assembly, comprising:
   an enclosure providing an interior area that houses one or more battery arrays;
   a bracket secured relative to the enclosure; and
   a bracket fastener having both a stem and a head, the stem extending longitudinally from the head along a longitudinal axis of the bracket fastener, the head and the stem different portions of the same bracket fastener, the head enlarged radially relative to the stem, the head captured between the bracket and a surface of the enclosure; and
   a mechanical fastener that engages the bracket fastener to secure at least one of the battery arrays within the interior area of the enclosure.

2. The battery pack attachment assembly of claim 1, wherein the stem extends from the head away from the surface of the enclosure through an aperture in the bracket, wherein the bracket fastener and the bracket are disposed entirely within the interior area provided by the enclosure.

3. The battery pack attachment assembly of claim 1, wherein the mechanical fastener threadably engages the bracket fastener.

4. The battery pack attachment assembly of claim 1, wherein the bracket fastener is a swage nut.

5. A battery pack attachment assembly, comprising:
   an enclosure providing an interior area that houses one or more battery arrays;

a bracket secured relative to the enclosure; and a bracket fastener having a stem extending longitudinally from a head along a longitudinal axis of the bracket fastener, the head enlarged radially relative to the stem, the head captured between the bracket and a surface of the enclosure, wherein the bracket fastener is a first bracket fastener, and further comprising a second bracket fastener having a head captured between the bracket and the surface of the enclosure, and a first mechanical fastener that engages the first bracket fastener to secure a first one of the battery arrays, and a second mechanical fastener that engages the second bracket fastener to secure a different, second one of the battery arrays, wherein the battery arrays are battery arrays of a traction battery pack.

6. The battery pack attachment assembly of claim 1, wherein the bracket is riveted to the enclosure to secure the bracket relative to the enclosure.

7. The battery pack attachment assembly of claim 1, wherein a bracket pocket of the bracket is displaced along the longitudinal axis in a first direction relative to a primary bracket portion of the bracket, the head disposed within an open area between the bracket pocket and the surface of the enclosure, the primary bracket portion secured directly to the enclosure.

8. The battery pack attachment assembly of claim 7, wherein an enclosure pocket of the enclosure is displaced along the longitudinal axis in an opposite, second direction relative to a primary enclosure portion, the enclosure pocket providing some of the open area.

9. The battery pack attachment assembly of claim 1, wherein the surface of the enclosure is a surface of an enclosure tray.

10. A battery pack securing method, comprising:

securing a bracket relative to an enclosure of a battery pack to capture a head of a bracket fastener between the bracket and a surface of an enclosure, the bracket fastener having a stem that extends longitudinally from the head of the bracket fastener, the bracket fastener having both the head and the stem, the bracket fastener and the bracket disposed entirely within an interior area of the enclosure; and engaging the stem of the bracket fastener with a mechanical fastener to secure a battery array within an open area of the enclosure.

11. The battery pack securing method of claim 10, wherein the mechanical fastener extends through a bore within an endplate of the battery array, and further comprising clamping the endplate between a head of the mechanical fastener and the bracket during the engaging of the mechanical fastener with the bracket fastener.

12. The battery pack securing method of claim 11, wherein the mechanical fastener threadably engages the bracket fastener during the clamping.

13. The battery pack securing method of claim 10, further comprising riveting the bracket to the enclosure during the securing.

14. The battery pack securing method of claim 10, wherein the bracket fastener is a swage nut.

15. The battery pack securing method of claim 10, wherein the head of the bracket fastener is a first head of a first bracket fastener, and further comprising securing the bracket relative to the enclosure to hold a second head of a second bracket fastener between the bracket and the surface of the enclosure.

16. The battery pack securing method of claim 15, further comprising engaging the stem of the first bracket fastener with a first mechanical fastener to secure a first battery array to the enclosure, and engaging a stem of the second bracket fastener with a second mechanical fastener to secure a different, second battery array to the enclosure, wherein the battery arrays are battery arrays of a traction battery pack.

17. The battery pack securing method of claim 16, further comprising powering a powertrain of an electrified vehicle with the first and second battery arrays.

* * * * *